(No Model.)
E. B. HAMILTON.
NAIL AND WASHER FEEDER FOR BUTTON MACHINES.
No. 389,648. Patented Sept. 18, 1888.
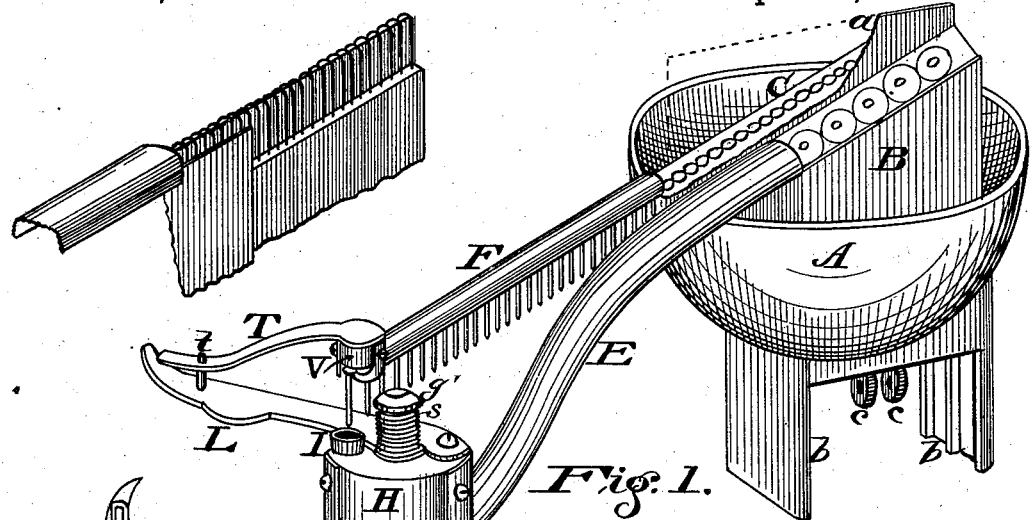
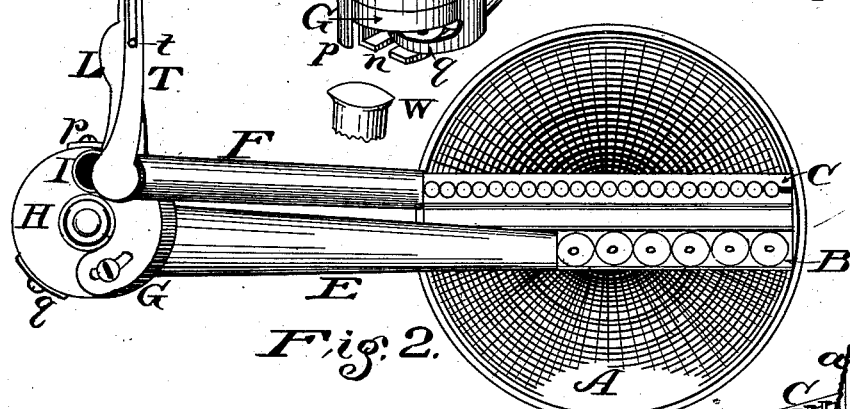
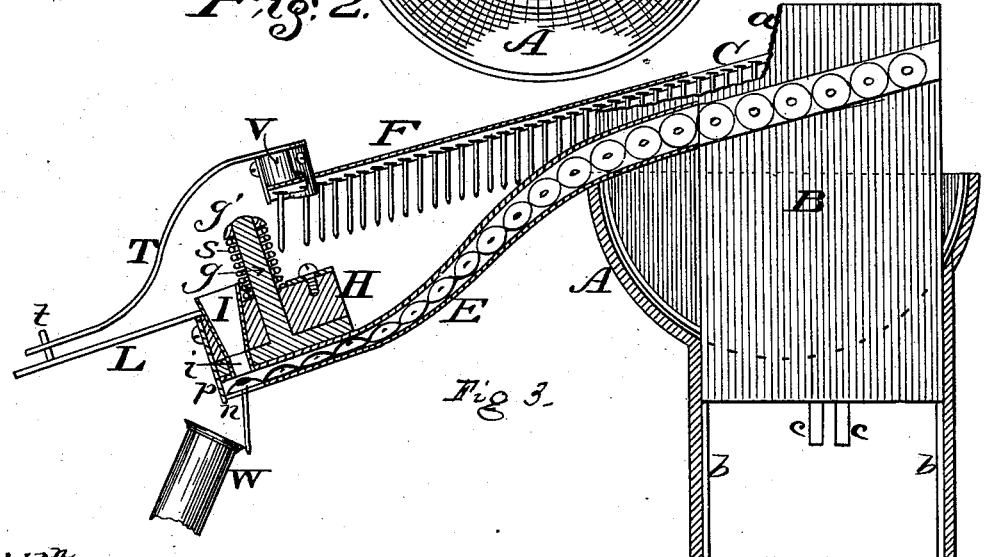
Witnesses,
Geo. B. Tibbitts
Young Ransom
Inventor,
Edgar B. Hamilton.
by Geo. W. Tibbitts Atty.

UNITED STATES PATENT OFFICE.

EDGAR B. HAMILTON, OF CLEVELAND, OHIO.

NAIL AND WASHER FEEDER FOR BUTTON-MACHINES.

SPECIFICATION forming part of Letters Patent No. 389,648, dated September 18, 1888.

Application filed March 5, 1888. Serial No. 266,256. (No model.)

*To all whom it may concern:*

Be it known that I, EDGAR B. HAMILTON, a citizen of the United States, residing at Cleveland, in the county of Cuyahoga and State of Ohio, have invented certain new and useful Improvements in Nail and Washer Feeders for Shoe-Button-Fastening Machines, of which the following is a specification.

This invention relates to a device for taking and conveying the nails and washers separately from a common hopper, then passing the nails one at a time through the washers, and feeding the joined nails and washers to the machine ready for fastening the buttons to the shoes.

Heretofore the work of joining the nails to the washers has been done by hand, and then the united nails and washers have been placed in a long slotted tube and fed from that to the machine.

The object of my invention is to obviate the slow and tedious work of preparing the nails and washers for the machine by hand and have the machine perform this automatically, as well as other parts of the machine-work, thus greatly facilitating the work of such machines. To accomplish this object I construct an attachment for shoe-button-fastening machines substantially as illustrated in the accompanying drawings, in which—

Figure 1 is a perspective view of my device as seen in working order. Fig. 2 is a top or plan view of the same. Fig. 3 is a vertical section of the same.

A is a hopper, which may be of any suitable form and dimensions, and provided with a vertical central partition, $a$, for holding nails in one side and washers in the other. Through the bottom of the hopper and at both sides of the partition are made slots, into which are fitted to slide two plungers, B C, the bottom of the hopper being provided with depending guides or ways $b\ b$ for the plungers to slide in. These plungers are designed to lift, arrange, and start the nails and washers in their transfer from the hopper to the machine, and are to be operated by suitable connection with an operating-lever on the machine, the plungers having lugs $c\ c$, by which the connection can be made, and the hopper is to be supported by a bracket or arm on the machine.

From the hopper are projected two tubes, E F, for conveying the nails and washers from the hopper. The one E for the washers is slightly twisted and bent to lead downward on an incline, so that the washers when they enter it will slide downward by their own gravity. The other tube has a slot along its under side, and is also inclined to convey the nails downward.

The washers and nails are started in their course through the tubes in the following manner: The top edge of the plunger B is inclined and beveled, having a thin ledge at the lower edge of the said bevel to catch the edge of the washers and hold them on the beveled surface, from which they roll into the tube E. The movements of the plunger up and down gather the washers on the said beveled surface, and as the washers are made concavo-convex they will not lie on the beveled surface, except as they fall thereupon with their concavo sides downward, for if their convex side is downward they will slide off from the bevel, as the ledge is not high enough to retain them. Thus the washers are always conducted into the tube the proper side uppermost. The washers which slide off the bevel will be tumbled over, and finally be caught on the incline the proper side up. The plunger C is very much like the plunger B, only its top edge is provided with a groove, instead of the bevel, for catching the nails and conveying them to the tube F. At the lower end of the said tubes E F is the mechanism for uniting the nails with the washers, described as follows:

G is a disk attached to the upper side of the lower end of the tube E, having a central spindle, $g$, upon which is placed a rotating disk, H. Through the disk G is made a hole, $i$, connecting with the tube E, and through the disk H is placed a funnel-shaped tube, I, made to alternately connect with the hole $i$ in the movements of said disk H for joining the nails to the washers.

To the top of the disk H is attached a lever, L, by which movement is imparted to the said disk on the spindle in one direction by connection with a suitable operating part of a button-fastening machine. Upon the spindle is fixed a retracting-spring, S, between the head $g'$ and the disk H, which moves the disk in one direction. A stop, $p$, is attached to the side of the disk H, next to the said funnel I, which holds the lowest washer in place over a notch, $n$, in the tube E for the nail to drop into the washer, which, however, releases said nail and washer as soon as the disk is turned. Another stop, $q$, attached to the side of the disk H, is provided, having a curved finger, which, as the disk moves around, enters the opening in the end corner of the tube and holds the row of washers from sliding down until the return movement of the disk. The released nail and washer drop into the mouth of a tube, W, which leads to the button-fastening mechanism of a button-fastening machine. (Not shown.)

To the end of the nail-tube F is provided a like mechanism to that just described, for releasing the nails one by one, and as the nails are released they drop into the funnel tube I, and from thence, as before described, are dropped into the holes in the washers. A lever, T, attached to the disk V, projects downward, and is connected to the lever L by means of a pin, $t$, on lever L, playing in a slot in the end of said lever T.

The hopper A may be adapted to feed staples or two-pronged fasteners by making a thin longitudinal partition in the top groove of plunger C, across which the staples would straddle and slide down into the tube F, which should also have a continuation of said thin partition running along its slot; or the tube might be dispensed with and the staples may travel down an inclined strip.

From the foregoing the operation of this device is as follows: The nails and washers are placed promiscuously in their respective sides of the hopper, from whence the plungers pick them up, arrange them in proper position, and start them on their travels down their respective tubes. At the lower ends of the said tubes the nails are united and dropped into the conveying tube of the button-fastening machine ready for use in such machine for securing buttons onto shoes.

Having described my invention, what I claim, and desire to secure by Letters Patent, is—

1. The combination of a hopper, as A, having a central partition, and plungers B C, playing through slots in bottom of said hopper and in guides underneath, the plunger B having inclined and beveled top edge with narrow ledge, and the plunger C having inclined and grooved top edge, said plungers being adapted to catch and deliver the washers and nails to the feeding-tubes E F, substantially as and for the purpose specified.

2. The combination, with the tube E, of the delivering mechanism, consisting of a disk, G, having the central spindle, $g$, and a hole, $i$, communicating with the tube E, the moving disk H, fixed to turn on said spindle and having the funnel-tube I, alternately communicating with the said hole $i$, also provided with the stops $p$ $q$, and having the spring S and lever L, by means of which said mechanism is adapted to receive the nail, drop it into the washer, and deliver them unitedly into the receiving-tube W, substantially as specified.

3. The combination, with hopper A, of the plunger C, having inclined and grooved top, a slotted tube, F, leading from said plunger and provided at its lower end with a dropping mechanism, consisting of a disk, V, turning on a pivot and having stops $p'$ $q'$, and a lever, T, connected to lever L and operated thereby, whereby the nails are delivered one by one to the tube I of the washer-feeding mechanism, substantially as described.

EDGAR B. HAMILTON.

Witnesses:
   GEO. W. TIBBITTS,
   F. W. CADWELL.